Figure 1:
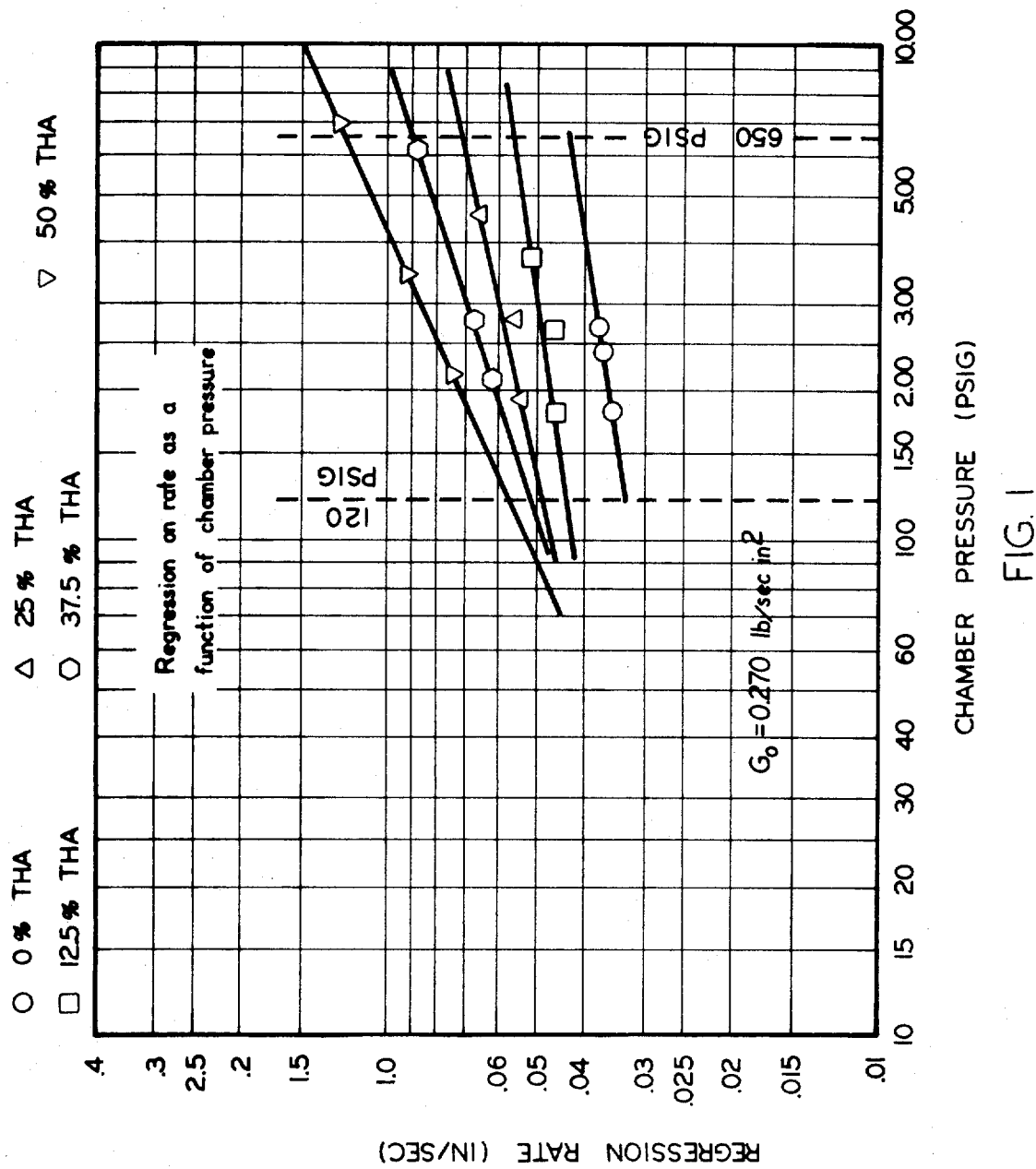

United States Patent
Rains et al.

[11] 3,727,407
[45] Apr. 17, 1973

[54] METHOD OF HYBRID PROPULSION WHICH INCREASES THE EFFECT OF PRESSURE ON BURNING

[75] Inventors: William A. Rains; Peter L. Stang, both of San Jose, Calif.

[73] Assignee: United Aircraft Corporation, Hartford, Conn.

[22] Filed: Nov. 20, 1964

[21] Appl. No.: 414,053

[52] U.S. Cl. ..................60/220, 60/219, 149/19, 149/20, 149/36
[51] Int. Cl. ..................C06d 5/06, C06d 5/10
[58] Field of Search..................149/19, 20, 2, 36; 60/219, 220

[56] References Cited

UNITED STATES PATENTS 3,083,527   4/1963   Fox..................149/2 X

*Primary Examiner*—Benjamin R. Padgett
*Attorney*—Jack L. Bohan

[57] ABSTRACT

The present invention relates to solid propellant compositions and more particularly to a composition for the solid phase of a hybrid motor.

13 Claims, 2 Drawing Figures

METHOD OF HYBRID PROPULSION WHICH INCREASES THE EFFECT OF PRESSURE ON BURNING

Conventional hybrid rocket engines employ a solid fuel grain having a central perforation and appropriate means for injecting a liquid oxidizer into the perforation whereupon the oxidizer and the fuel react to form high-temperature gases for propulsion. However, conventional hybrid engines suffer from several problems which have severely limited the application of hybrid motors for space missions. One problem is the relatively low regression rate of the solid fuel grain. Because vaporization of the fuel must primarily depend on heat transferred from the hot combustion zone, regression rates on the order of 0.03 inches per second are normal. Attempts have been made to add oxidizer materials to the hybrid fuel grain in order to cause local combustion at the grain surface and thereby increase the regression rate; however, it has been found that to effectively alter the regression rate, such large quantities of oxidizer are required that combustion becomes self-sustained, sacrificing on-off capability, the inherent advantage of hybrid motors.

The present invention, however, provides a system for supplementing the normal hybrid heat-transfer from the combustion zone to the fuel grain by causing an exothermic surface reaction on the hybrid grain by means of a special class of fuel additives. It has been found that the desired surface reaction is realized by employing the propellant formulations employing such compounds as triaminoguanidine azide, hydrazine azide and the double salts of these compounds. These additives have been found to generate fuel species highly suited for combustion with the oxidizer phase and release heat in the process to increase fuel delivery.

Although the aforementioned improved hybrid formulation is effective for substantially increasing the regression rate of the solid phase, a most notable aspect of the present invention is the overcoming of serious oxidizer-fuel ratio imbalance normally brought about when a hybrid motor is throttled. It has been found in conventional hybrids that the fuel delivery rate from the grain surface is approximately a direct function of the square root of the quantity of oxidizer injected into the port. Consequently, when a conventional hybrid system is running at a perfect stoichiometric balance and the quantity of oxidizer is reduced in order to reduce the thrust level, fuel is evolved from the grain surface in quantities greater than can react with the oxidizer, thereby resulting in a fuel-rich mixture and producing decreased engine performance as well as propellant waste. The present hybrid formulations, however, substantially mitigate stoichiometric imbalance on throttling since it was discovered that triaminoguanidine azide, hydrazine azide and the double salts of these compounds are apparently sensitive to combustion chamber pressure so that when the combustion chamber pressure is decreased on throttling, the exothermic surface reaction also decreases, thereby reducing the fuel delivery rate from the hybrid grain surface. As a result, the stoichiometric balance between oxidizer and fuel is substantially maintained over a wide throttling range.

It is an object, therefore, of the present invention to provide a hybrid fuel formulation having a relatively high regression rate.

It is a further object of the present invention to provide a hybrid fuel which has very high specific impulse values.

It is still a further object of the present invention to provide a solid hybrid fuel which mitigates extreme shifts in oxidizer to fuel ratios on throttling.

It is still a further object of the present invention to provide a solid hybrid grain having a regression rate which is pressure sensitive.

It is another object of the present invention to provide a hybrid grain which is safe to handle.

The above and other objects of this invention are accomplished by a unique hybrid fuel grain formulation wherein well-known binders are loaded with a fuel component which releases large quantities of gas and heat upon decomposition and which has a decomposition rate which is pressure sensitive. It has been found that suitable fuel components for this purpose are triaminoguanidine azide, hydrazine azide and double salts of these compounds. Typical binders which are suitable for the practice of the present invention are polyethylene, polysulfides, polybutadienes and polyurethanes; also, the usual energetic metals such as aluminum, lithium, boron and others may be added to the formulations of the present invention along with the many other conventional hybrid additives.

Although the exact theory of the present invention is not clearly understood, it is believed that the triaminoguanidine azide, the hydrazine azide and the double salts of these compounds in the solid hybrid fuel grain decompose exothermically at the surface of the grain and subsequently react with the binder and other constituents, thereby evolving fuel species which readily combine with the oxidizer phase. By virtue of this effect, the regression rate of the hybrid grain is not strictly dependent upon energy input from the combustion zone but is self-activating to a degree.

The exact theory of operation in connection with the pressure sensitivity of the propellant formulation of the present invention is even less clearly understood; however, one possible explanation is that when the combustion chamber pressure is increased, the reaction products from the azide compounds and associated materials are compressed into a smaller volume and thereby increase the energy feedback to the unreactive portion.

In the past, it has been found by empirical studies that when the oxidizer rate of flow is increased, the regression rate of many hybrid fuels is approximately a direct function of the square root of the increase in oxidizer. Consequently, if stoichiometric conditions exist prior to an increase in oxidizer mass rate of flow, then a fuel deficiency is created when the oxidizer mass rate of flow is increased. This is because the fuel rate of delivery is increased only at a fraction of what the oxidizer has increased since it increases only as a function of the square root of the quantity of oxidizer being injected. Even though the injection of additional oxidizer increases the combustion chamber pressure, this increase in pressure per se has no tendency to increase the regression rate of the hybrid grain in the same manner that an increase in pressure increases the regression rate of a solid propellant grain. It is believed that a solid propellant grain increases its regression rate upon increase in pressure because the oxidizer constituents in the grain are pressure sensitive producing increased burning. It is a unique aspect of the present invention, therefore, that a fuel constituent, as opposed to an oxidizer constituent, is employed in the hybrid grain which has been discovered to be pressure sensitive and thereby brings about an increase in regression rate upon increase in pressure.

Accordingly, when hybrid grains are formulated in accordance with the teachings of the present invention, an increase in the oxidizer mass rate of flow not only brings about the usual disproportionate increase in fuel rate delivery but provides supplemental fuel delivery by means of a pressure sensitive reaction of azide compounds sufficient to make up the deficiency thereby maintaining the oxidizer-fuel stoichiometry. Consequently, hybrid motors employing the grains of the present invention may be throttled over a wide range without effecting a serious diminishment in the motor performance or substantial imbalance of oxidizer and fuel stoichiometry.

The compositions of the hybrid fuel grains of this invention as well as the methods for the preparation will be more fully understood by considering the following examples.

EXAMPLE 1

The following formulation was prepared in the laboratory by hand mixing procedures:

| Ingredients | Percentage By Weight |
| --- | --- |
| Double salt of triaminoguanidine azide and hydrazine azide (THA) | 45.60 |
| Boron (powder) | 18.20 |
| LP-33 Polymer (Thiokol polysulfide - ethyl formal polysulfide polymer with an average molecular weight of approximately 3,000) | 32.75 |
| Para-quinone dioxime | 2.26 |
| Diphenylguanidine | 1.17 |
| Sulfur | 0.02 |

Because THA is inherently toxic and is a class A explosive, weighing and handling of this material must be carried out under low moisture conditions such as in a dry nitrogen or dry argon filled dry box. All materials, with the exception of the THA, are carefully poured into a polyethylene beaker and mixed with a nonsparking plastic spatula until a homogeneous consistency is achieved. Approximately half of the THA is then poured into the beaker and carefully stirred until all the THA is dispersed and wetted by the polymer. The remainder of the THA is then poured into the beaker and mixed in. The beaker containing the propellant is then removed from the dry box and placed in a vacuum oven with an observation port at a temperature of 135° F. A vacuum is imposed and continually increased until expanding bubbles cause the propellant to rise close to the top of the beaker, at which point the vacuum is held momentarily until the bubbles subside and then the vacuum is again increased to bring the foaming level to the top of the beaker. After approximately 15 to 30 minutes, depending on the batch size, the propellant will no longer bubble and the propellant is ready for oven curing. Curing is effected by bringing the oven down to ambient pressure and holding the propellant at 135° F for 24 hours. If motors are to be cast from the hand mixes, then immediately after the propellant has been degased but still remains in a liquid state, casting is performed by pouring the propellant mix from the beaker into the motor chamber containing a centrally located teflon mandrel. The motor and contents are then maintained at 135° F for a period of 24 hours until the propellant is fully cured. Upon cooling, the mandrel is removed and the motor is ready for firing.

In one experiment, the aforementioned formulation was cast into cylindrical motor cases 3 inches long and having an inside diameter of 1.25 inches. One end was capped and a cylindrical teflon mandrel placed in the center thereof. The propellant mix was poured into the motor case and cured for 24 hours at 135° F whereupon the mandrel was removed and the propellant at the open end of the case trimmed flush. The motor was then fired with gaseous oxygen as the liquid phase whereupon it was found that the propellant possessed an extremely high regression rate.

EXAMPLE 2

The following formulation was prepared by a machine mixing technique:

| Ingredients | Percentage By Weight |
| --- | --- |
| Double salt of triaminoguanidine azide and hydrazine azide (THA) | 50.00 |
| Boron | 20.00 |
| P-2000 (polyglycol from the Dow Chemical Company — average molecular weight 2,000) | 17.10 |
| LD-124 (Liquid polybutane-diol from United Carbide — average molecular weight 1000) | 8.10 |
| 1,2,6-hexanetriol | 0.02 |
| 2,4-toluene diisocyanate | 4.78 |

All THA weighout operations of the above formulations should be performed within a dry box enclosure because of THA's inherent toxicity and explosive nature. All the above ingredients, with the exception of THA, are then weighed out, preferably in a dry box also, and charged into the mixer by hand. These materials are then mixed for 2 minutes without vacuum at ambient temperature. The mixing operations are performed remotely in a temperature controlled mixer equipped with a vacuum header. This is then followed by mixing for 3 minutes with vacuum at ambient temperature. Next, the mixture is brought up to the ambient pressure again, the THA is carefully added, and the batch is then mixed for 5 minutes at ambient temperature and pressure. The batch is then mixed for 10 minutes under vacuum at ambient temperature whereupon it is then ready for casting. The fuel is then vacuum cast into motor hardware and subjected to vibration. The entire motor is then sealed into a plastic bag and cured in a precision hot water oven. After the curing operation, the fuel is cooled and the casting hardware removed.

Motors 3 inches in length with a 0.75 inch diameter port and 0.25 inch propellant web thickness were fired with gaseous oxygen whereupon it was evident that the fuel enjoyed an unusually high regression rate and that the regression rate was also a strong function of chamber pressure.

EXAMPLE 3

The following formulation was prepared by machine mixing as outlined in Example 2:

| Ingredients | Percentage By Weight |
|---|---|
| R-45 (liquid hydroxy terminated polybutadiene from Sinclair Petrol Chemicals Inc. possessing an average molecular weight of 2200) | 20.52 |
| R-15 (liquid hydroxy terminated polybutadiene from Sinclair Petrol Chemicals Inc. possessing an average molecular weight of from 2,800 – 3,000) | 5.13 |
| Vistanex LM-MS (a viscous liquid polyisobutylene from Enjay Chemical Corporation — molecular weight from 8,700 to 10,000) | 3.00 |
| 2,4-toluene diisocyanate | 1.35 |
| THA (Double salt of triaminoguanidine azide and hydrazine azide) | 50.00 |
| Aluminum (H-322 by Valley Metalurgical) | 12.00 |
| Aluminum (R-1-131 by Reynolds Aluminum Corporation) | 8.00 |

The above formulation was subjected to detonation shock by exploding tetryl pellets pressed up against the surface of the propellant. No propagation of the explosion occurred through the propellant. Hybrid motors were prepared from this formulation which were fired with inhibited red fuming nitric acid and again increased regression rates which were pressure dependent were observed.

EXAMPLE 4

The following formulation was prepared by machine mixing as outlined in Example 2:

| Ingredients | Percentage By Weight |
|---|---|
| R-45 (liquid hydroxy terminated polybutadiene from Sinclair Petrol Chemical Corporation having an average molecular weight of 2,200) | 36.24 |
| R-15 (liquid hydroxy terminated polybutadiene from Sinclair Petrol Chemicals Inc. having an average molecular weight of 2,800 to 3,000) | 9.03 |
| 2,4-toluene diisocyanate | 3.73 |
| THA (double salt of triaminoguanidine azide and hydrazine azide) | 50.00 |
| Carbon Black | 1.00 |

The above formulations were cast into motors up to 5 inches in diameter and fired with mixtures of liquid oxygen, inhibited red fuming nitric acid and mixtures of liquid perchloryl fluoride and chlorine trifluoride with increased, pressure dependent regression rates being observed.

EXAMPLE 5

The following formulation was prepared by hand mixing and contains TAZ (triaminoguanidine azide) instead of THA:

| Ingredients | Percentage By Weight |
|---|---|
| TAZ (triaminoguanidine azide) | 50.00 |
| Cab-O-Sil (powdered SiO$_2$ from Cabot Corporation) | 2.00 |
| P-2,000 (polyglycol from the Dow Chemical Company — average molecular weight 2,000) | 27.48 |
| LD-124 (liquid polybutane-diol from United Carbide — average molecular Weight 1,000) | 12.85 |
| 1,2,6hexanetriol | 0.02 |
| 2,4-toluene diisocyanate | 7.65 |

The above formulation was cast into motor 3 inches in length with a 0.75 inch diameter port and 0.25 inch web. Subsequent testing of these motors with gaseous oxygen at increasing pressures resulted in high regression rates and pressure sensitivity only slightly lower than that obtained with the THA propellant.

The following formulations in Table I were prepared by machine mixing and show the effect of varying the THA content from 0 to 50 per cent:

TABLE I

| Ingredients | A | B | C | D | E |
|---|---|---|---|---|---|
| THA (double salt of traiminoguanidine azide and hydrazine azide) | 0.00 | 12.50 | 25.00 | 37.50 | 50.00 |
| R-45 (liquid hydroxy terminated polybutadiene from Sinclair Petrol Inc.—average molecular weight of 2,200) | 82.15 | 71.78 | 61.40 | 51.03 | 40.66 |
| R-15 (liquid hydroxy terminated polybutadiene from Sinclair Petrol Chemicals, Inc.—Average molecular weight 2,800 to 3,000) | 9.11 | 7.96 | 6.81 | 5.66 | 4.51 |
| 2,4-toluene diisocyanate | 7.74 | 6.76 | 5.79 | 4.81 | 3.83 |
| Carbon Black | 1.00 | 1.00 | 1.00 | 1.00 | 1.00 |

The above formulations were cast into motors 6 inches long to give grains with a ½ inch port and ¼ inch web. Upon testing with gaseous oxygen, the pressure sensitivity of each formulation was rated and is shown in FIG. 1. In each case, mass rate of flow of oxygen was maintained at 0.270 pound of oxygen per second per square inch of port area. The lowest curve for formulation A shows a typical regression rate increase for a hybrid. In increasing the chamber pressure from 120 to 650 psig, the regression rate increased from only 0.033 inch per second to 0.043 inch per second.

However, in formulation E with 50 per cent THA, the regression rate was not only higher to begin with at 120 psig, namely 0.057 inch per second, but increased to over 0.12 inch per second at 650 psig. From FIG. 1 it is apparent that the slope of the curves are steeper when the THA is increased in the formulation.

Figure 2:
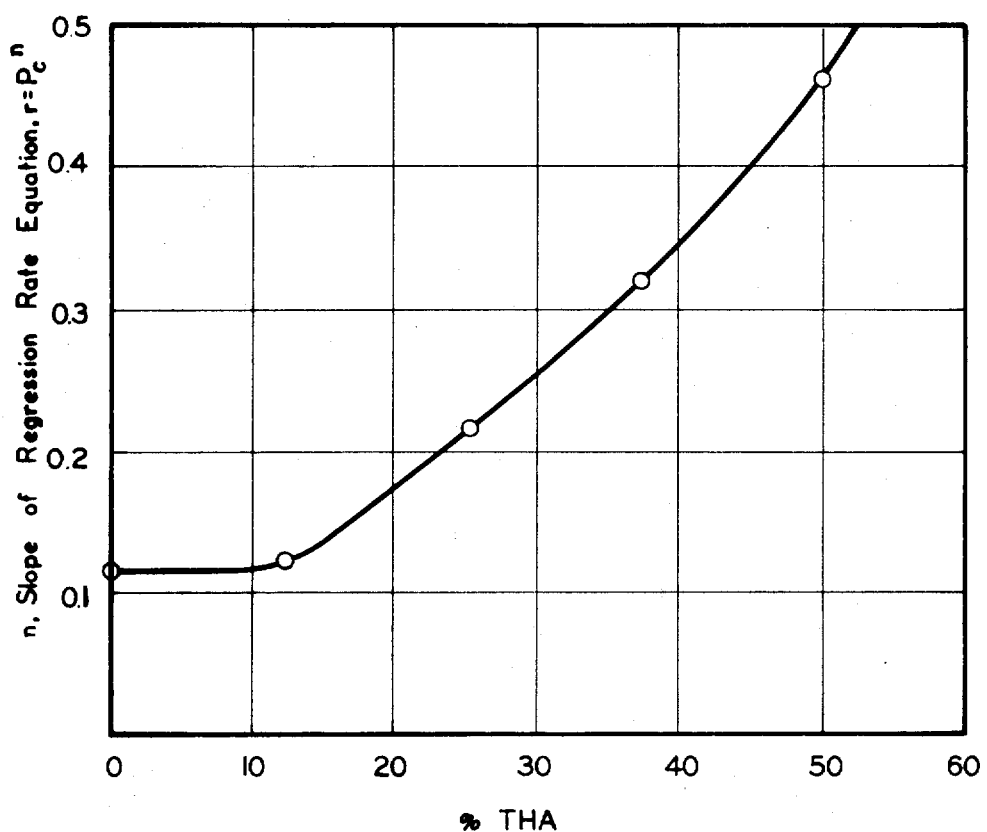

The increase in slope is plotted as a function of per cent THA in FIG. 2 whereupon it is clear that the pressure sensitivity effect of THA is marked at THA levels over 12.5 per cent. Consequently, in those applications where throttling is desired, but the range is not too extensive, quantities as little as 12.5 to 25 per cent of the azide compounds may be used to bring about the supplemented fuel delivery. However, where a wide range of throttling is required, 50 per cent of the double salt and more may be employed in the hybrid fuel formulation.

It is to be understood that in addition to binder and azide compounds, preferred hybrid fuel grains may employ a wide variety of other constituents such as high energy metal additives, conventional regression rate catalysts, and many other conventional hybrid components which perform specialized functions.

Accordingly, it is to be understood that the specific embodiments of the invention herein disclosed are of a descriptive nature rather than a limiting nature, and that various changes, combinations, substitutions or modifications may be employed in accordance with these teachings without departing either in spirit or scope from this invention and its broader aspects.

We claim:

1. A method for selectively increasing the effect of combustion chamber pressure on the burning rate of a fuel-rich polymeric hybrid propellant grain comprising incorporating into said grain a predetermined quantity of a component selected from the group consisting of triaminoguanidine azide, hydrazine azide, and the double salt of triaminoguanidine azide and hydrazine azide, whereby, at higher chamber pressures, the burning rate of said grain is increased and the oxidizer to fuel ratio is maintained at substantially optimum values.

2. A method as in claim 1 wherein said component is in excess of 12.5 per cent by weight of the said grain.

3. A pressure sensitive, fuel-rich hybrid propellant grain consisting essentially of a polymeric binder and a component selected from the group consisting essentially of triaminoguanidine azide, hydrazine azide and the double salt of triaminoguanidine azide and hydrazine azide.

4. In a method for producing thrust by reacting a fluid oxidizer with a solid, fuel-rich hybrid propellant grain within a combustion chamber and exhausting the reaction products from the combustion chamber, the improvement wherein said fuel-rich grain comprises a polymeric binder having dispersed therethrough a quantity of a component selected from the group consisting of triaminoguanidine azide, hydrazine azide and the double salt of triaminoguanidine azide and hydrazine azide.

5. The method of claim 4 wherein the quantity of said component is in excess of 12.5 per cent by weight of said fuel-rich grain.

6. The method of claim 5 wherein said fuel-rich grain has dispersed therein a quantity of a metal selected from the group consisting of aluminum, lithium and boron.

7. The method of claim 5 wherein said component is the double salt of triaminoguanidine azide.

8. The method of claim 6 wherein said component is the double salt of triaminoguanidine azide.

9. The method of claim 5 wherein said component is the double salt of triaminoguanidine azide and hydrazine azide.

10. The method of claim 6 wherein said component is the double salt of triaminoguanidine azide and hydrazine azide.

11. The method of claim 5 wherein said propellant grain is substantially free of solid oxidizer material.

12. A pressure sensitive, fuel-rich hybrid propellant grain as in claim 3 wherein the binder is selected from the group consisting of polyethylene, polysulfides, polybutadienes and polyurethanes.

13. In a fuel-rich hybrid propellant grain consisting essentially of a polymeric binder in combination with high-energy, metal additives and other conventional fuel-rich hybrid propellant grain additives the improvement comprising incorporating therein at least 12.5 per cent by weight a component selected from the group consisting of triaminoguanidine azide, hydrazine azide and the double salt of triaminoguanidine azide and hydrazine azide.

* * * * *